United States Patent
Klein et al.

(10) Patent No.: US 12,466,664 B2
(45) Date of Patent: Nov. 11, 2025

(54) APPARATUS AND PROCESS FOR THE TEMPORARY STORAGE OF PIECE GOOD STACKS IN A SYSTEM FOR PRODUCING FOOD PRODUCTS

(71) Applicant: BÜHLER GMBH, Reichshof (DE)

(72) Inventors: Achim Klein, Iserlohn (DE); Kay Hauschulz, Sankt Augustin (DE); Mark Knapp, York (GB); Stephen Chapman, York (GB); Sean Knight, Newcastle (GB)

(73) Assignee: BÜHLER GMBH, Reichshof (DE)

( * ) Notice: Subject to any disclaimer, the term of this patent is extended or adjusted under 35 U.S.C. 154(b) by 425 days.

(21) Appl. No.: 17/998,412

(22) PCT Filed: Apr. 20, 2021

(86) PCT No.: PCT/EP2021/060146
§ 371 (c)(1),
(2) Date: Nov. 10, 2022

(87) PCT Pub. No.: WO2021/228504
PCT Pub. Date: Nov. 18, 2021

(65) Prior Publication Data
US 2023/0183023 A1    Jun. 15, 2023

(30) Foreign Application Priority Data
May 11, 2020    (EP) .................................... 20173961

(51) Int. Cl.
*B65G 47/51*    (2006.01)
*B65G 47/90*    (2006.01)

(52) U.S. Cl.
CPC ......... *B65G 47/5109* (2013.01); *B65G 47/90* (2013.01); *B65G 2201/0202* (2013.01)

(58) Field of Classification Search
CPC . F27B 9/201; F27B 9/202; F27B 9/24; B65G 59/02; B65G 47/5109; B65G 47/90;
(Continued)

(56) References Cited

U.S. PATENT DOCUMENTS 3,601,266 A    8/1971    Pearne et al.
4,509,891 A    4/1985    Lipscomb
(Continued)

FOREIGN PATENT DOCUMENTS

DE    601 10 678 T2    2/2006
EP    0 255 622 A2    2/1988
(Continued)

OTHER PUBLICATIONS

International Search Report Corresponding to PCT/EP2021/060146 mailed Jun. 29, 2021.
(Continued)

*Primary Examiner* — Gregory W Adams
(74) *Attorney, Agent, or Firm* — Finch & Maloney PLLC

(57) ABSTRACT

A device and method for temporarily storing stacks of piece goods which are provided in a clocked manner at a transfer point integrated in the device or adjacent to the device of a system for producing food products, in particular chocolate products, comprising: one or more storage points, a delivery point, a transport apparatus for moving the stacks of piece goods in the direction of transport; and a manipulator by means of which the transfer point, the delivery point as well as the storage points arranged therebetween can be approached; wherein at least one piece of goods of a stack of piece goods, preferably a plurality of piece goods of a stack of piece goods, can be transferred at once to the delivery point by the manipulator; wherein the stacks of piece goods can be separated at the delivery point and fed to a downstream section of the system; and wherein the flow of
(Continued)

Figure 1:
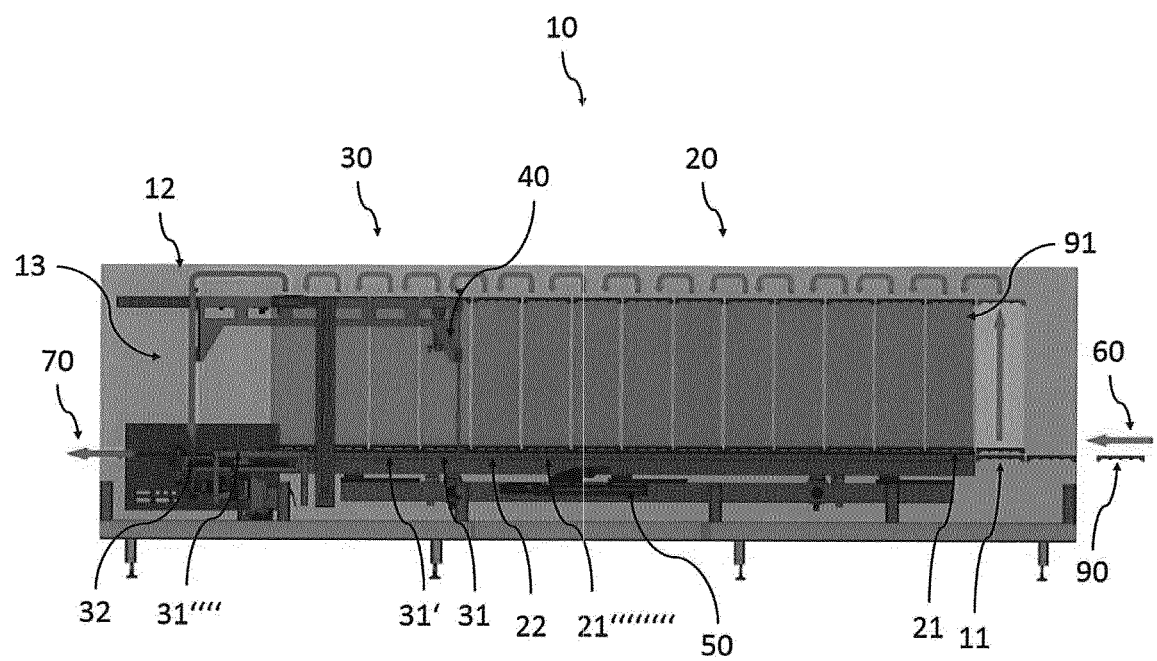

stacks of piece goods provided at the transfer point can be decoupled from the downstream section of the system by successively occupying the storage points.

19 Claims, 6 Drawing Sheets

(58) Field of Classification Search
CPC ............ B65G 61/00; B65G 2201/0202; B65G 60/00; B65G 2207/46; B65G 59/10; F26B 15/18; F26B 25/001; Y10S 198/952
USPC ..... 414/795.6, 795.8, 796.9, 797; 198/339.1, 198/345.1, 468.4, 468.3; 426/524
See application file for complete search history.

(56) References Cited

U.S. PATENT DOCUMENTS

| | | | |
|---|---|---|---|
| 4,842,930 A | 6/1989 | Schinkel et al. | |
| 6,146,087 A | 11/2000 | Perry | |
| 6,640,963 B2 | 11/2003 | Lecrivain | |
| 8,549,866 B2* | 10/2013 | Hummrich | F25D 13/067 |
| | | | 99/335 |
| 2011/0041706 A1 | 2/2011 | Whetstone, Jr. | |
| 2011/0045155 A1* | 2/2011 | Whetstone, Jr. | A23G 1/26 |
| | | | 425/150 |
| 2018/0142954 A1* | 5/2018 | Ferrero | F26B 15/18 |
| 2020/0002107 A1 | 1/2020 | Morency et al. | |

FOREIGN PATENT DOCUMENTS

| | | |
|---|---|---|
| JP | 860-56728 A | 4/1985 |
| WO | 2017/129720 A1 | 8/2017 |
| WO | 2018/202801 A1 | 11/2018 |

OTHER PUBLICATIONS

Written Opinion Corresponding to PCT/EP2021/060146 mailed Jun. 29, 2021.

* cited by examiner

APPARATUS AND PROCESS FOR THE TEMPORARY STORAGE OF PIECE GOOD STACKS IN A SYSTEM FOR PRODUCING FOOD PRODUCTS

The present invention relates to a device for temporarily storing stacks of piece goods for a system for producing food products, in particular chocolate products, a method for decoupling an incoming flow of stacks of piece goods from a downstream section of a system for producing food products, in particular chocolate products, and a system with a device according to the invention.

Devices of the generic type are used, for example, between a production apparatus and a packaging apparatus and, inter alia, are also known under the terms buffer storage, buffer device or product flow regulator. In order to avoid product jams and associated operational disruptions, packaging facilities are usually designed such that their packaging capacity is higher than the output of the production apparatus. In the event of an intentional or unintentional interruption in the operation of the packaging apparatus, the products in the production process usually still have to be discharged from the production apparatus, which is why stopping or shutting down the production apparatus is often only possible with a considerable delay. However, since the products discharged from the production equipment are not picked up by the packaging apparatus, this results in a product jam and, in the case of food products, often also in rejects. For this reason, measures are taken in such product flows to decouple the product flow provided by a production apparatus from a downstream section of the system.

Known from the prior art are temporary storage facilities with a multiplicity of vertically arranged temporary storage levels in which the products to be stored are moved by means of an elevator from the level at which they arrive to the level at which they are temporarily stored or are picked up from the intermediate storage levels and brought to the level for transfer.

However, such temporary storage levels have the disadvantage that they complicate the production process considerably, require a high input of financial resources and also take up a lot of space.

From WO2018/202801 A1 production plant for the production of flat, stackable bakery products is known. The production plant comprises a transport device with a first transfer point at the inlet of the transport device, downstream of the first transfer point conveyor belts and downstream of the conveyor belts a second transfer point at the outlet of the transport device. The first transfer point has a first manipulator by which the baked products can be stacked and/or unstacked one on top of the other, and the second transfer point has a second manipulator by which the baked products can be stacked and/or unstacked one on top of the other, so that the baked products can be stored in the transport device by forming stacks of the baked products.

In the light of the aforementioned prior art, the object underlying the present invention is to eliminate such and other disadvantages of the prior art and, in particular, to specify a device and a method by which temporarily storing of stacks of piece goods can be implemented in a more cost-efficient, space-saving manner while avoiding high reject rates.

The object is achieved in particular by a device, a system comprising a device according to the invention and a method according to the independent claims. Advantageous configurations and refinements are subject matter of the dependent claims.

The object is in particular achieved by a device for temporarily storing stacks of piece goods which are provided in a clocked manner at a transfer point integrated in the device or adjacent to the device of a system for producing food products, in particular chocolate products. According to the invention, the device has a buffer section comprising one or more storage points and a delivery point. The device further comprises a transport apparatus for moving the stacks of piece goods and a manipulator. The manipulator can approach the transfer point, the delivery point and the storage points located between the transfer point and the delivery point. The manipulator can transfer the piece goods to the delivery point, wherein the manipulator can transfer in each case at least one piece of goods of a stack of piece goods, preferably a plurality of piece goods of a stack of piece goods at once, to the delivery point. The piece goods transferred to the delivery point and arranged in a stacked manner can be separated at the delivery point and fed to a downstream section of the system. By successively occupying the storage points with stacks of piece goods, the flow of piece goods provided at the transfer point can be decoupled from a downstream section of the system.

With the device according to the invention, a flexible temporary storage requiring little space can be implemented, in which the stacks of piece goods can be temporarily stored if a downstream section of the system has to be serviced at short notice or cannot pick up piece goods for other reasons.

Of course, it would also be conceivable that the piece goods pass through the device according to the invention in a separated form instead of in the form of stacks of piece goods, although this would not result in all of the advantages described. In particular, a higher throughput associated with separated piece goods would have the consequence that the buffer effect achievable by occupying the provided storage points, i.e. the time delay of the incoming flow of piece goods from a system section downstream of the device, would decrease.

In the context of the present invention, the terms "station" or "stations" refer to the respective positions along the conveyor path formed by the transport apparatus, which the piece goods reach when passing through the device according to the invention. Each of these positions has a surface area (A) which corresponds at least to the length (1) and at least to the width (b) of piece goods passing through the device of the invention, in particular substantially exactly to the length (1) and width (b) of piece goods passing through the device according to the invention. In particular, the terms "station" or "stations" refer to the positions along the conveyor path to which the piece goods are moved by the transport apparatus within the machine cycle and at which the piece goods come to a brief standstill. The transport apparatus of the device according to the invention thus comprises a transport path which is long enough to provide a number of positions for piece goods which is required or desired for a respective application.

In a preferred embodiment, the device according to the invention further comprises a treatment section with one or more treatment stations. In this embodiment, the transfer point is integrated into the device according to the invention and is arranged following the treatment stations in the direction of transport. The stacks of piece goods located at the treatment stations and optionally at the transfer point can be actively treated in the region of these stations.

By integrating the upstream section of the system into the temporary storage according to the invention, a device with buffer function built in a particularly compact and space-saving manner can be provided.

In a particular embodiment of the device according to the invention, there is no active treatment of the stacks of piece goods in the buffer section, i.e. in the region of the delivery point and the storage points.

In the context of the present invention, an active treatment is to be understood as a process or a combination of processes which constitutes a work step in the production of food. For example, active treatments take place in mold changing sections, heating sections, cooling sections or demolding sections of a system for producing food products. In particular, active treatment in the context of the present invention is to be understood as a cooling process of the stacks of piece goods, thus a reduction in the temperature of the piece goods. In the case that the piece goods are product carriers, cooling the product carriers also causes a cooling of the products arranged in the product carriers. An example is the blowing of cold air at the stacks of piece goods to solidify liquid chocolate which has been filled into the product carriers in an upstream section of the system. The transport of the stacks of piece goods in the direction of transport by means of the transport apparatus as well as the transfer of piece goods by means of the manipulator is not to be understood as active treatment in the context of the present invention.

In a preferred embodiment, the device according to the invention further comprises an apparatus for stacking the piece goods arriving at the device in separated form from a section of the system arranged upstream of the device. The apparatus is designed to transfer the stacks of piece goods formed by the apparatus to the first treatment station in the direction of transport.

In the context of the present invention, a stack of piece goods is to be understood as an arrangement of at least two piece goods in layers on top of each other. Such apparatuses for the stacking and unstacking of stackable piece goods, such as, for example, product carriers or molds, are known to the person skilled in the art from WO 2017/129720 A1, for example.

By the stack-like grouping of the piece goods arriving in separated form at the device according to the invention, a deceleration of the system cycle in the region of the device according to the invention can be achieved. In other words, the stacked grouping results in a pre-buffering by which the time period during which the buffer can be filled can be extended and the capacity of the temporary storage according to the invention can be increased.

Preferably, the manipulator is a gantry system. The gantry system is designed for contacting, removing, transferring as well as depositing piece goods, in particular product carriers, at the delivery point. The contact apparatus of the gantry system is movable in height and, on the other hand, in and counter to the direction of transport of the piece goods, so that the transfer point, the storage points as well as the delivery point can be approached by the gantry system.

Gantry systems are symmetrically constructed Cartesian robot systems for the multi-dimensional movement of transport and work equipment in a working area that can be defined by mechanical linear movement devices. In practice, gantry systems are used in a variety of ways, for example to carry out loading or mounting tasks. Gantry systems of the generic type comprise a gantry intended for stationary installation with a basic unit which can be moved in the x-direction over the length of the gantry, as well as arrangements associated with the basic unit which can be moved vertically in the z-direction and horizontally in the y-direction, for example transport and/or gripping devices. Such a gantry system is known from EP 0 255 622 A1, for example.

The design of the manipulator as a gantry system results in a particularly stable construction and a high transfer capacity while achieving high positioning accuracy of the piece goods.

In a preferred embodiment of the device according to the invention, the transport apparatus is designed as an inline transport apparatus of a system, which can be interposed between a section arranged upstream and a section arranged downstream section in the system in the direction of transport.

The term "inline system" has become firmly established in the field of industrial food production, also in German technical language. An inline transport apparatus represents part of the conveyor path of the system, which moves the stacks of piece goods through the treatment section in the direction of transport. In the event of an interruption in operation in a downstream section of the system, the conveyor path available for the stacks of piece goods can be extended by the transport apparatus by moving the stacks of piece goods into the buffer region in the direction of transport.

Thus, no bypass or other diversion of the piece goods is necessary, which allows a very fast reaction to downstream interruptions in operation. In particular, this means that a separate part of the system does not have to be activated, as is usual in the prior art.

In the context of the present invention, an interruption of operation is to be understood as any condition of a system section in which the throughput of the corresponding system section is less than 100% of the throughput achieved in normal operation of this system section. For example, an interruption of operation may be an interruption in packaging.

For moving the stacks of piece goods in the direction of transport, walking beam conveyors, for example, can be used, which, in their generic form, have a plurality of walking beams of the same conveyor type arranged one behind the other in the direction of transport and coupled together, which are moved back and forth together in cycles via their traction drive. The individual conveyors are each coupled together by a connecting rod. The walking beam(s) can be raised and lowered by means of their lifting devices so that the piece goods or stacks of piece goods resting on lateral support surfaces are moved in a clocked manner along the transport direction by a coordinated lifting/pushing movement, i.e. they are transported to the respective treatment, transfer or storage point located nearest in the direction of transport. Such a walking beam conveyor is known from the prior art, for example from DE 601 10 678 T2. Of course, it is also conceivable according to the invention that, for example, the transport apparatus moves two stacks of piece goods in pairs by in each case two positions in the direction of transport.

In a preferred embodiment of the device according to the invention, the transport apparatus is designed as a walking beam conveyor system. The walking beam conveyor system comprises two push bars with drivers, which push bars are arranged parallel to each other, an electric linear drive for moving the push bars in a direction of transport (T, T1, T2) and at least one pneumatic drive for vertical movement of the push bars.

In a preferred embodiment, the device according to the invention further comprises a casing. The casing creates a space controlled with regard to humidity and/or temperature. Alternatively or additionally, the space enclosed by the casing also protects the piece goods contained therein from other environmental influences. The buffer section and optionally the treatment section are arranged in this space.

Due to the possibility of setting controlled temperature and/or humidity conditions and/or the protection against other harmful environmental influences, the time in which the stacks of piece goods can remain in the buffer storage can be increased and rejects can be reduced or avoided.

In a preferred embodiment, the device according to the invention has at least one control unit which comprises interfaces for data transfer with control units of upstream and/or downstream sections of the system. Thereby, the control unit of the device according to the invention can be connected or is connected in a ring or series connection with the control units of the upstream and/or downstream sections of the system.

By means of such a ring or series connection it is made possible that the individual sections of the system, in particular the device according to the invention and a downstream section of the system, can exchange data with each other and that the individual sections of the system, in particular the device according to the invention, can each be controlled independently. The device according to the invention thus enables a fully automatic compensation of short-term interruptions of operation in one or more of the downstream sections of the system.

The control unit is preferably connected to at least one sensor located at one of the upstream and/or downstream sections of the system, which detects the operating state of the respective section. Furthermore, in this preferred embodiment of the device according to the invention, the control unit is designed for controlling the manipulator and the transport apparatus so that the activity of the manipulator and of the transport apparatus can be controlled via the control unit, depending on the respective operating state of the upstream and/or downstream section.

This enables that the device according to the invention can react to the performance of an upstream and/or downstream section of the system, thereby increasing the efficiency and utilization of the temporary storage. For example, the activity of the manipulator can already be automatically stopped and the stacks of piece goods provided in cycles can instead be moved successively to the storage points available in the direction of transport if an interruption is foreseeable in a downstream section of the system, for example when reloading the packaging apparatus with packaging material, so that production can continue even during a stop in the downstream section of the system.

Furthermore, the object is achieved by a system for producing food products, in particular chocolate products, comprising a device according to the invention.

Such a system has the advantage that in the event of a failure and/or interruption of operation in a section of the system arranged downstream of the device according to the invention, a separate system section does not have to be activated or integrated into the system, thus, for example, moved towards the latter, as is usual in the prior art. Thus it is possible to react very quickly to such failures and/or interruptions of operation and the variance in the throughput of the corresponding system section associated with the failure and/or interruption of operation can be compensated fully automatically.

The object is further achieved by a method for temporarily storing stacks of piece goods in a system for producing food products, in particular chocolate products. According to the method according to the invention, the stacks of piece goods are provided in a clocked manner at a transfer point of the system integrated in the device or adjacent to the device. As an option, the stacks of piece goods first move in the direction of transport through one or more treatment stations up to the transfer point. Provided that the piece goods can be picked up from a downstream section of the system, a manipulator transfers at the transfer point or alternatively from one of the storage points in each case at least one piece of goods of a stack of piece goods, preferably a plurality of piece goods of a stack of piece goods at once to the delivery point. At the delivery point, the piece goods are separated and fed to a downstream section of the system.

Such a method enables a particularly efficient decoupling of an incoming flow of stacked piece goods from a downstream section of the system.

In particular, the method according to the invention is provided for use with a device according to the invention.

According to a particular embodiment of the method, the piece goods are product carriers. In the context of the present invention, product carriers are in particular also to be understood as hollow molds, as they are known for the production of confectionery products.

The food products produced in the system can be treated and/or transported in the product carriers.

In an advantageous embodiment of the method according to the invention, in the event of an interruption of operation in a section of the system downstream of the temporary storage, the stacks of piece goods arriving at the transfer point are moved by the transport apparatus to the storage point nearest to the transfer point in the direction of transport. If there are already stacks of piece goods in the temporary storage, these stacks are moved further from their respective storage point to the storage point closest in the direction of transport. When operation is resumed by the section of the system arranged downstream of the temporary storage, the stacks of piece goods temporarily stored in the storage points are transferred by the manipulator to the delivery point.

Preferably, the stacks of piece goods temporarily stored in the storage points are transferred by the manipulator to the delivery point according to the first-in first-out principle when operation is resumed in the downstream section of the system.

Through the first-in first-out principle it is achieved that the order of the provided piece goods is at least partially maintained when occupying the storage points of the temporary storage as well as when delivering them to the downstream section of the system, which has advantages in minimizing rejects, in particular in the production of food.

Preferably, the flow rate of piece goods delivered to the downstream section of the system is between 0 and 120% in relation to the number of piece goods arriving at the transfer point per machine cycle of the transport apparatus.

If the piece goods are transferred by the manipulator faster than they are provided by the upstream section of the system, the stacks of piece goods temporarily stored in the device according to the invention can be removed again when operation is resumed in a downstream section of the system and the previously occupied storage points can be released again, whereby the system can be set back to a normal operating state. In this normal operating state, transferring the piece goods from the transfer point directly to the delivery point of the system is carried out by the manipulator. The faster the stacks of piece goods can be transferred and unstacked, the faster the storage points can be emptied.

According to a preferred embodiment of the method according to the invention, a control unit and at least one sensor connected to the control unit and arranged at one of the downstream sections of the system are provided. The sensor determines the operating state of the downstream section of the system. The control unit comprises interfaces for data transfer with control units of upstream and/or downstream sections of the system. Furthermore, the control unit of the temporary storage according to the invention is connected to the control units of the upstream and/or downstream sections of the system in a ring or series connection so that the activity of the manipulator as well as of the transport apparatus is controlled and/or regulated via the control unit depending on the operating state of the downstream section.

This embodiment of the method according to the invention has the advantage that the temporary storage can react automatically to the throughput or the operating state of a downstream section of the system, whereby the efficiency and the utilization of the temporary storage can be increased. For example, in the event of a foreseeable interruption of operation in a downstream section of the system, the activity of the manipulator can already be automatically stopped and the stacks of piece goods provided at the transfer point can be successively moved in the direction of transport to the available storage points, so that production can continue even during a stop in the downstream section of the system.

If a system stop during filling of the temporary storage is delayed to such an extent that all available storage points are occupied by stacks of piece goods and the respective stacks of piece goods in the temporary storage can therefore no longer be moved one position further in the direction of transport when restarting the production, the foremost stack in the temporary storage must first be processed before resuming production by the upstream section of the system.

Furthermore, according to the invention, an apparatus for the automated detection of the occupancy status of the storage points is preferably provided for this purpose. In this embodiment of the method according to the invention, production is stopped in at least one of the upstream sections of the system when all storage points in the temporary storage are completely occupied. Before resuming production, at least the storage point immediately preceding the delivery point is emptied by the manipulator.

This ensures that the temporary storage is not filled beyond its capacity, which could also damage the stacks of piece goods already temporarily stored in the temporary storage, in particular the food products arranged in the product carriers. On the other hand, emptying the storage point immediately preceding the delivery point prevents that the capacity of the interim storage facility is already exhausted in the event that two failures or interruptions of operation occur in quick succession and that the production in one of the upstream sections of the system has to be interrupted.

Figure 2:
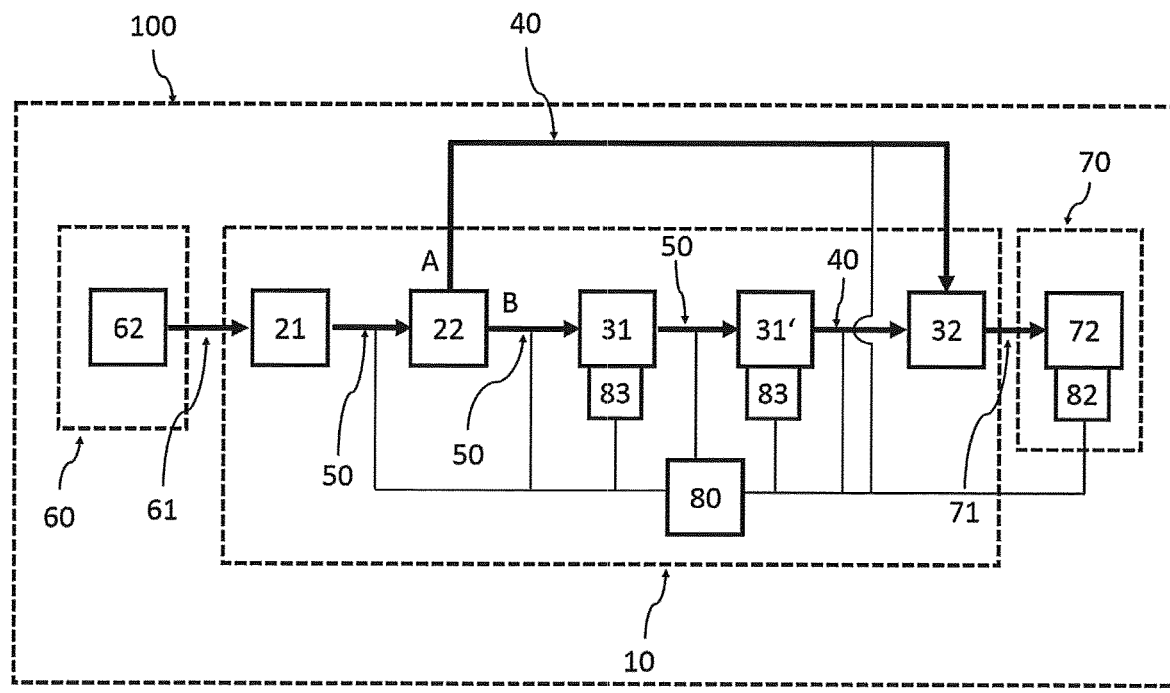
Figure 3A:
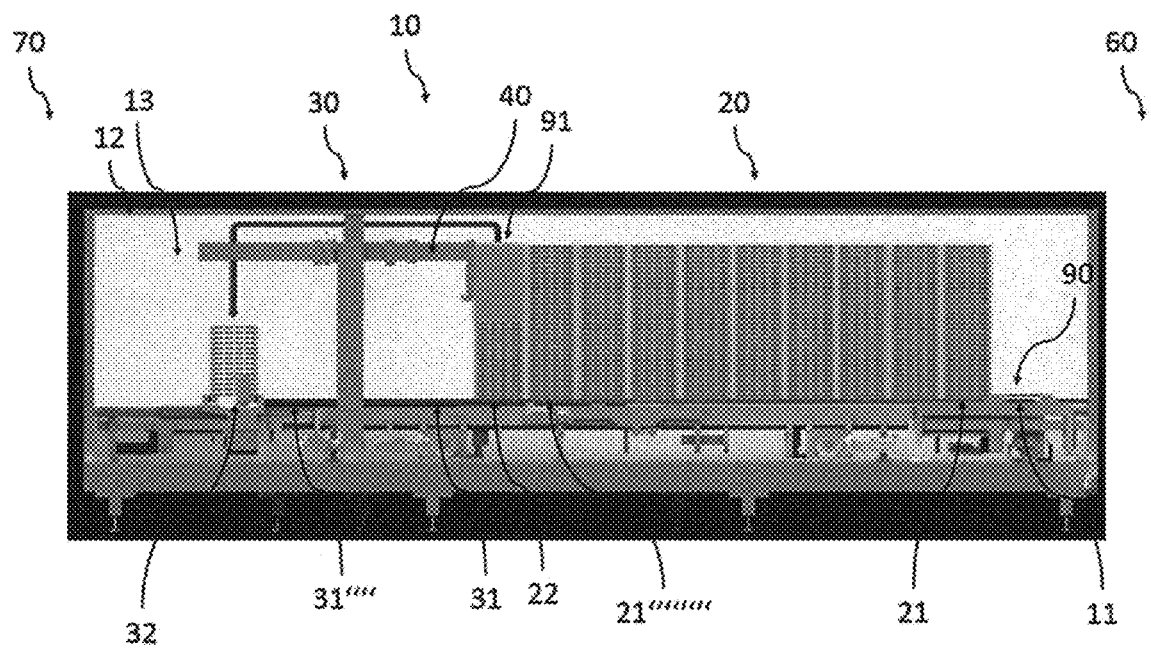
Figure 3B:
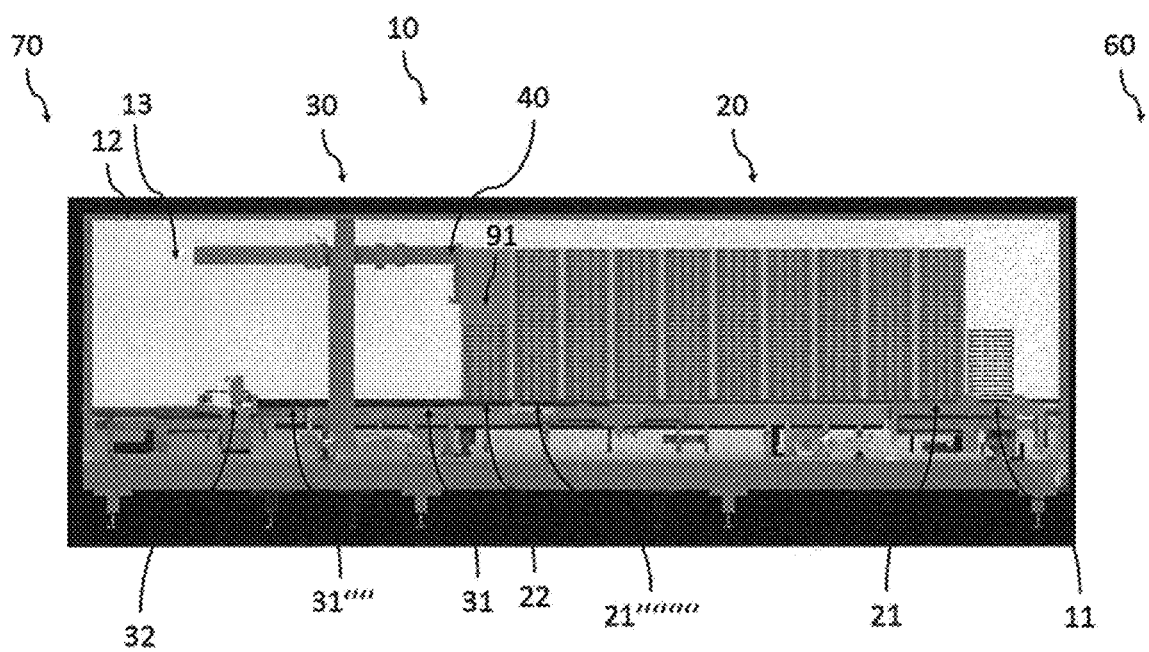
Figure 3C:
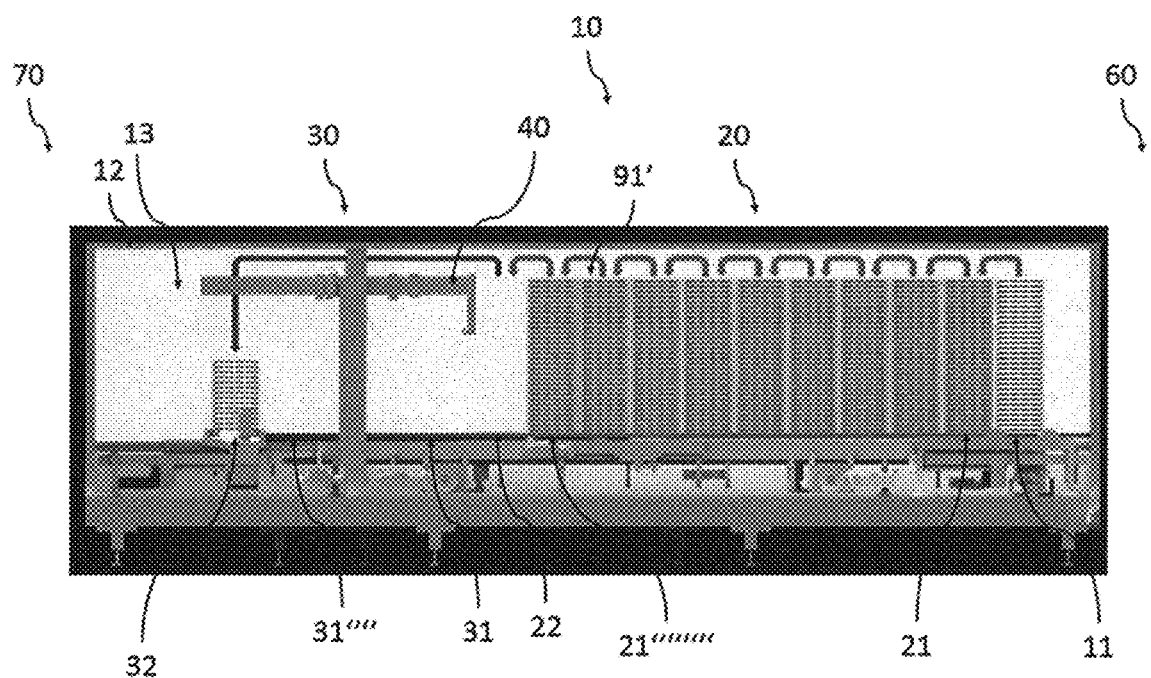
Figure 3D:
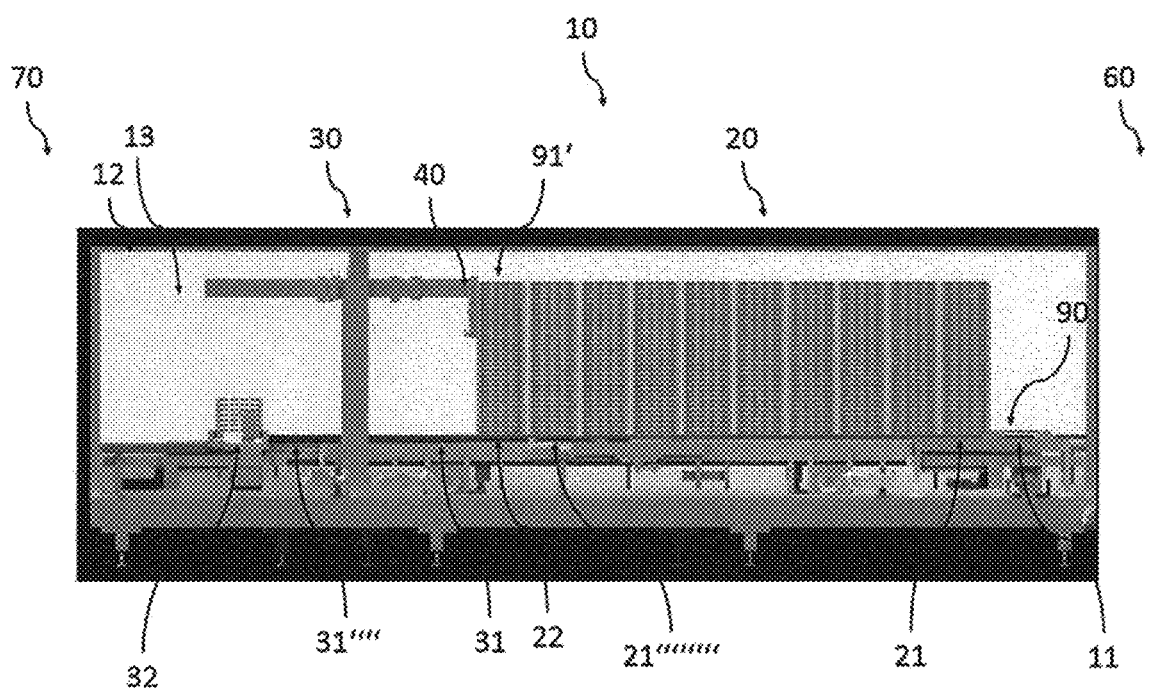
Figure 4A:
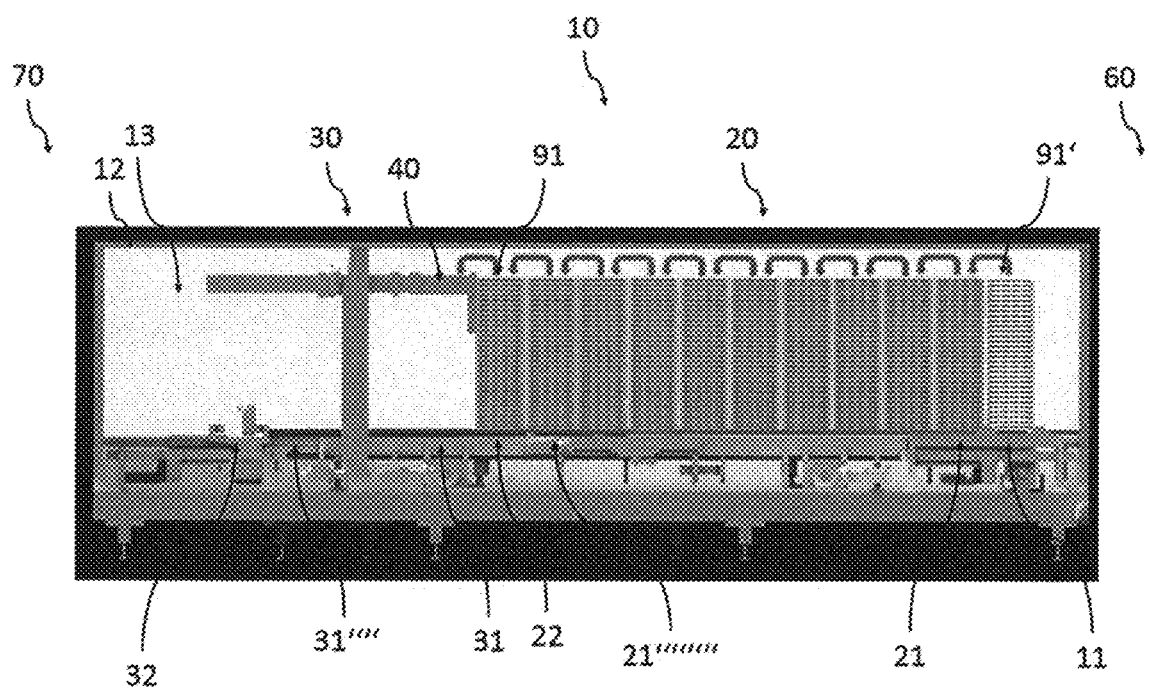
Figure 4B:
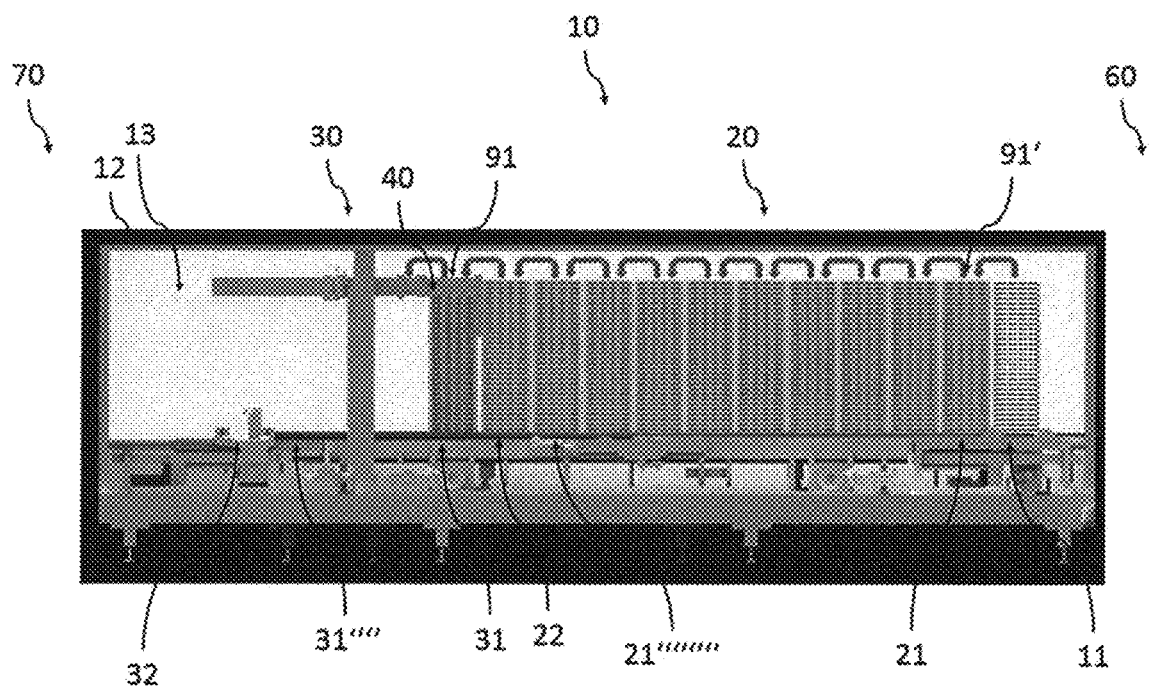
Figure 4C:
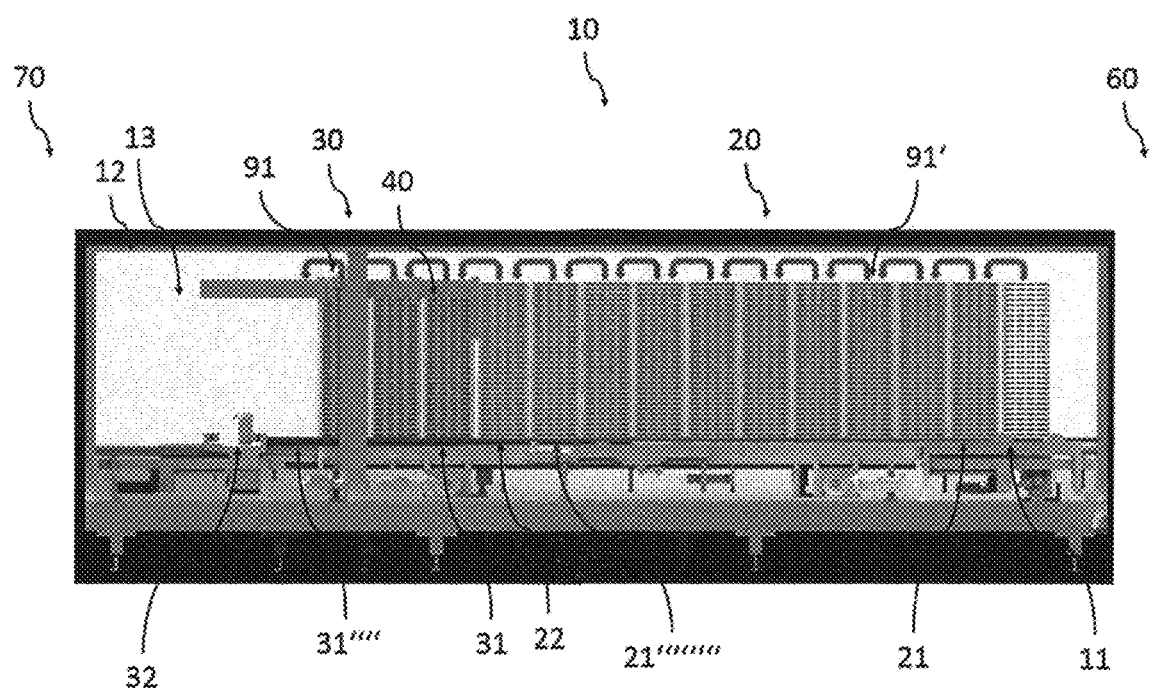
Figure 4D:
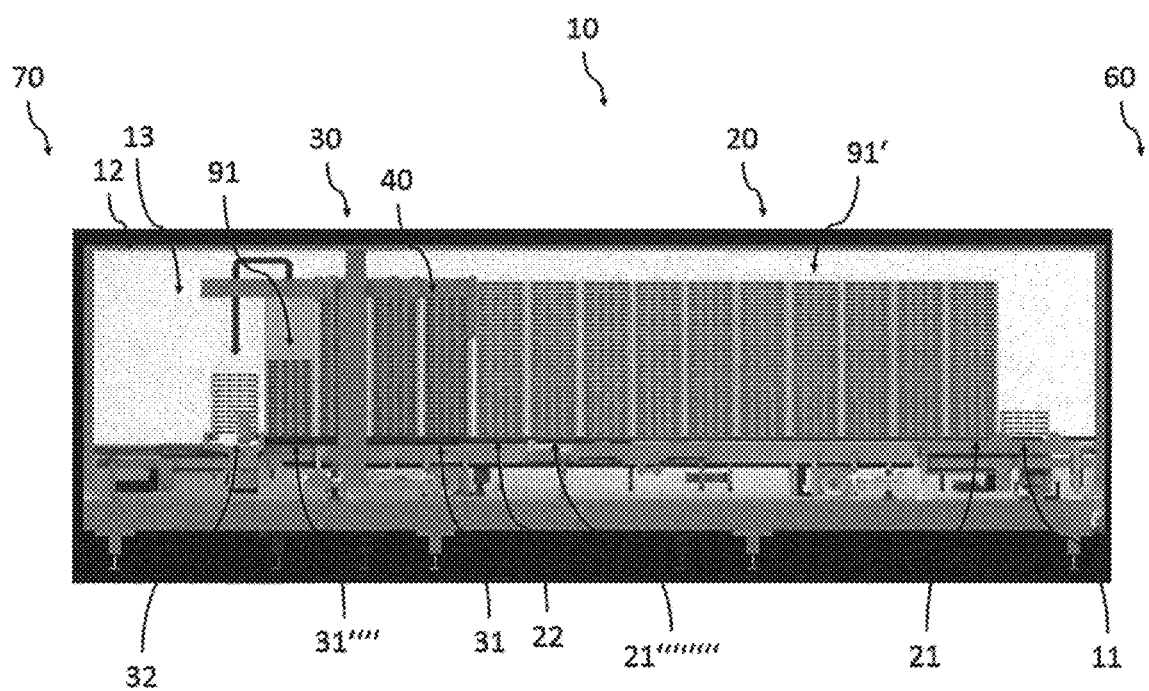

In the following, the invention is illustrated by way of examples based on figures in which similar or identical elements are assigned the same reference signs. In the figures:

FIG. 1: shows a schematic illustration of an embodiment of the device according to the invention;

FIG. 2: shows a flow chart of an embodiment of the method according to the invention;

FIG. 3: shows a schematic illustration of an embodiment of the method according to the invention;

FIG. 4: shows a schematic illustration of a further embodiment of the method according to the invention.

FIG. 1 is a schematic side view of a device according to the invention. The device (10) comprises a treatment section (20) with a plurality of treatment stations (21 to 21) and a transfer point (22), as well as a buffer section (30) with storage points (31 to 31'''') and a delivery point (32). Furthermore, the device (10) comprises a transport apparatus (50) and a manipulator (40). On the inlet side, an apparatus (11) is provided for stacking the separated piece goods (90) provided by the upstream section (60) of the system (100) (stacker indicated by arrow pointing upwards). The device (10) has a casing (12) which encloses a space (13) controlled with regard to humidity and/or temperature and/or protects it from other environmental influences. For example, the casing (12) is intended for substantially the entire device (10). The treatment section (20) and the buffer section (30) have a common transport apparatus (50). The stacks of piece goods (91) pass through the individual treatment stations (21) to the transfer point (22) in the work cycle of the device (10) according to the invention. This is schematically illustrated by arrows in FIG. 1. To decouple the production flow from the downstream section (70) of the system (100), the stacks of piece goods (91), for example stacked product carriers (92), are first moved from the transfer point (22) to the first storage point (31) and from there, if necessary, are moved further via the remaining storage points (31' to 31'''') in the direction of the last storage point (31'''') at the end of the transport apparatus (50) in the work cycle of the device (10) according to the invention. In the present example, the storage point (31'''') directly preceding the delivery point (32) can still be occupied. The manipulator (40) is, for example, a gantry system (41) which can be displaced in the direction of transport and counter to the direction of transport so that the transfer point (22), the storage points (31 to 31'''') and the delivery point (32) can be approached by the gantry system (41). Furthermore, the gantry system (41) is height-adjustable and comprises a gripper so that the layers of piece goods (90) of the stacks of piece goods (91) can be picked up individually from top to bottom and transferred to the delivery point (32). It is of course also possible for the gripper to pick up a plurality of piece goods (90) at once, for example three piece goods, and transfer them as a stack (91) consisting of three piece goods (90) to the delivery point (32). The transfer of the piece goods (90) or parts of stacks of piece goods (91) is indicated schematically in FIG. 1 by the red shading and the red arrow. The passage of the stacks of piece goods (91) through the treatment section (20) and the occupation of the storage points in the buffer section (30) always takes place in the work cycle of the transport apparatus (50) of the device (10) of the invention, wherein separating the temporarily stored stacks of piece goods (91) is carried out at a variable speed, whereby the flow of piece goods (90) arriving at the transfer point (22) can be decoupled from the downstream section (70) of the system (100).

In FIG. 2, an embodiment of the method according to the invention is schematically illustrated in the form of a flow-chart. Shown is a system (100) for producing food products. In the present example, the food products are chocolate products which are produced or arranged in product carriers (92) and are stacked in the section (60) of the system (100) upstream of the device (10), in particular in a palletizer (62) of the system. FIG. 2 does not show the product carriers (92) or the stacks of product carriers (93), but instead indicates the flow of production by arrows. For example, the work cycle of the upstream section (60) in normal operation of the system (100) is fifteen product carriers (92) per minute, which are provided by an inlet-side transport apparatus (61) in the form of stacks (93), each comprising thirty product carriers (92), at the treatment station (21) of the device (10) according to the invention arranged first on the inlet side. FIG. 2 shows only one treatment station, wherein the device

(10) can of course include a plurality of treatment stations (21') through which the stacks (93) are moved in the direction of the transfer point (22) in line with the work cycle of the device (10) according to the invention. In the present example, the transport apparatus (50, 61) of the device (10) according to the invention and of the section (60) preceding the latter are synchronized regarding the work cycle, i.e. stacks (93) pass through the device (10) at substantially the speed at which the stacks (93) arrive at the device (10). The transfer point (22) is the treatment station arranged last in the direction of transport, to which the storage points (31, 31') are connected. During normal operation of the system (A), the stacks (93) provided at the transfer point (22) are transferred by the manipulator (40) to the delivery point (32). Transferring the product carriers (92) of a stack (93) by the manipulator (40) can be carried out individually or in groups. In the latter case, for example, three product carriers (92) are picked up at once by the manipulator (40) from the stack (93) arranged on the transfer point (22) and placed as a stack of three product carriers on the delivery point (32). In normal operation, the operating speed of the manipulator (40) is 100% in relation to the product output of the upstream section (60) of the system (100). In other words, the speed at which the piece goods (90) entering the device (10) and provided at the transfer point (22) are removed by the manipulator (40) and fed via the delivery point (32) to the downstream section (70) is such that a new stack of piece goods (91) is substantially provided at the transfer point (22) as soon as the preceding stack (91) has been completely removed and the transfer point (22) has been emptied. From the delivery point (32), the product carriers (92) are fed to the downstream part (70) of the system (100), for example to a demolding apparatus (72), via a transport apparatus (71) of the downstream section (70). According to a preferred embodiment, a control unit (80) is provided which controls the manipulator (40) and the transport apparatus (50) of the device (10) according to the invention. The operating state of the downstream section (70) of the system (100) and/or the occupancy state of the storage points (31, 31') can be monitored via schematically illustrated sensors (82) and/or monitoring devices (83). Accordingly, in the event of an unforeseen failure and/or a lower throughput rate of the downstream section (70) of the system (100), the operating speed of the manipulator (40) can be adjusted. For the temporarily storing (B) of the stacks (93) still provided in line with the work cycle of the transport apparatuses (50, 61), the operating speed of the manipulator is reduced to 0% with regard to the production rate of the upstream section (60) of the system (100) and the stacks (93) are moved from the transfer point (22) to the storage point (31) of the device (10) closest in the direction of transport. The transport of stacks (93) is carried out as schematically illustrated in FIG. 2, preferably by means of an inline transport apparatus. As long as the downstream section (70) of the system (100) has a lower output than 100% with regard to the production rate of the upstream section (60) of the system (100), stacks (93) provided at the transfer point (22) are moved successively in line with the work cycle to the storage points (31, 31') of the device (10). As soon as the failure has been resolved and/or the downstream section (70) of the system (100) is ready for operation again, the storage points (31, 31') which have been occupied in the meantime are emptied by the manipulator (40) by transferring the stacks (93) arranged thereon to the delivery point (32), from where they are fed to the downstream section (70) of the system (100) via a corresponding transport apparatus (71). For example, the downstream section (70) of the system (100) is cagable of taking eighteen product carriers (92) per minute, which corresponds to 120% of the production rate of the upstream section (60) of the system (100). With a constant number of stacks of piece goods (90) in the stacks of piece goods (91) and by means of a correspondingly high operating speed of the manipulator (40), the storage points (31, 31') of the device (10) according to the invention (10) can be emptied faster than new stacks (93) are provided at the transfer point (22). In this way, the device (10) can temporarily store the stacks (93) as required and deliver them to the downstream section (70) of the system (100) with a time delay without having to interrupt production in the upstream section (60) of the system (100).

In FIG. 3, the process flow of a method according to the invention is illustrated in more detail. FIG. 3a exemplifies a state that can occur during normal operation of the system (100), i.e., when the downstream system section (70) of the system (100) receives piece goods (90). A stack of piece goods (91) provided at the transfer point (22) of the treatment section (20) of the apparatus (10) is removed by the manipulator (40) by the manipulator transferring a plurality of piece goods (90) of the stack (91) at once to the delivery point (32). In FIG. 3b it is illustrated that at the delivery point (32), the stack of piece goods placed thereon is unstacked and the separated piece goods are fed to the downstream section (70) of the system (100). Meanwhile, the flow of piece goods arriving from the upstream section (60) of the system (100) is stacked by a stacking apparatus arranged on the inlet side. As soon as the transfer point (22) has been completely emptied by the manipulator (40) and a predetermined number of piece goods (90) has been stacked by the stacker (11), the stacks of piece goods (91) located in the device (10) are each moved forward by the transport apparatus (50) by one station in the direction of transport, as schematically illustrated by arrows in FIG. 3c. The state shown in FIG. 3d corresponds substantially to the state in FIG. 3a, with the difference that the manipulator (40) has not yet transferred any piece goods (90) from the stack (91') newly provided at the transfer point (22) to the delivery point (22). FIGS. 3a to 3d thus substantially describe a work cycle of the device (10) according to the invention, which is followed again by the processes described in FIG. 3a.

FIG. 4 shows in detail the process flow of another method according to the invention with a device according to the invention. FIG. 4a exemplifies a state as it can occur in the event of a failure and/or interruption of operation in a downstream section of the system (100), i.e. if the downstream section (70) of the system (100) does not pick up any piece goods (90). As soon as a predetermined number of piece goods (90), which arrive at the device (10) from the upstream section (60) of the system (100), have been stacked by the stacker (11) to form a stack of piece goods (91'), the stacks of piece goods located in the device (10) are each moved forward by the transport apparatus (50) by one station in the transport direction, as schematically illustrated by arrows in FIG. 4a. Since the downstream section (70) of the system (100) does not pick up any piece goods from the delivery point (32), the stack of piece goods (91) provided at the transfer point (22) is not transferred by the manipulator (40) to the delivery point (32), but is moved by the transport apparatus (50) to the storage point (31) of the buffer section (30) nearest in the direction of transport. Subsequently, piece goods (90) arriving on the inlet side at the device (10) are further stacked by the stacker (11). In the states illustrated in FIGS. 4b and 4c, the failure and/or interruption of operation still persists, so that still no piece goods (90) are picked up by the downstream section (70) of the system (100). Analogous to the state described in FIG. 4*a*, the stacks of piece goods (91) located in the device (10) are each advanced one station from their respective position in the direction of transport by the transport apparatus (50). FIG. 4*d* shows a state as it may appear in the downstream section (70) of the system (100) after resumption of operation. As illustrated in FIG. 4*d*, all storage points (31 to 31''') of the buffer section (30) were successively occupied with stacks of piece goods in the period from the occurrence of the failure and/or the interruption of operation in the downstream section (70) of the system (100) until the resumption of operation. Part of the stack of piece goods (91) located at the last storage point (31), which precedes the delivery point (32) in the direction of transport, has already been transferred by the manipulator (40) to the delivery point (32), from where the piece goods (90) are separated and fed to the downstream section (70) of the system.

It is, of course, in accordance with the invention, if in the course of a failure and/or interruption of operation in a downstream section of the system not all storage points available in the buffer section of the device according to the invention are occupied by stacks of piece goods. In this case it is possible that upon resumption of operation in the downstream section of the system, the stacks of piece goods can be transferred by the manipulator from the respective storage point, to which they were moved, to the delivery point.

The invention claimed is:

1. A device for temporarily storing stacks of piece goods, wherein the piece goods are product carriers, which are provided in a clocked manner at a transfer point integrated in the device or adjacent to the device of a system for producing food products, wherein the device includes:
   a buffer section comprising one or more storage points as well as a delivery point;
   a transport apparatus for moving the stacks of piece goods, which is designed in such a way that, in the event of an interruption in operation in a downstream section of the plant, a conveyor path available for the stacks of piece goods can be extended by the transport apparatus, by moving the stacks of piece goods in the transport direction into the buffer section; and
   a manipulator by means of which the transfer point, the delivery point as well as the storage points arranged therebetween can be approached;
   wherein at least one piece of goods of a stack of piece goods can be transferred at once to the delivery point by the manipulator; wherein the stacks of piece goods can be separated at the delivery point and fed to the downstream section of the system; and wherein the flow of stacks of piece goods provided at the transfer point can be decoupled from the downstream section of the system by successively occupying the storage points,
   wherein the transport apparatus is designed as a walking beam conveyor, wherein the conveyor comprises two push bars with drivers, which push bars are arranged parallel to each other, an electric linear drive for moving the push bars in a direction of transport, and at least one pneumatic drive for a vertical movement of the push bars.

2. The device according to claim 1, wherein the device further includes a treatment section comprising one or more treatment stations, wherein the transfer point is integrated into the device and follows the treatment stations in the direction of transport, wherein the stacks of piece goods can be actively treated at the treatment stations.

3. The device according to claim 2, wherein the stacks of piece goods can be actively treated at the transfer point.

4. The device according to claim 2, wherein no active treatment of stacks of piece goods arranged at the storage points and the delivery point is carried out in the buffer section.

5. The device according to claim 1, wherein the manipulator is a gantry system.

6. The device according to claim 1, wherein the transport apparatus is designed as an inline transport apparatus of a system, which can be interposed between an upstream section and a downstream section of the system in the direction of transport.

7. The device according to claim 1, wherein the device further comprises a casing which encloses a space controlled with regard to humidity and/or temperature and/or encloses a space protected from other environmental influences, wherein the buffer section is contained in the space.

8. The device according to claim 7, wherein the treatment section is contained in the space.

9. The device according to claim 1, wherein the device has at least one control unit which comprises interfaces for data transfer with control units of upstream and/or downstream sections of the system, so that the control units of the upstream and/or downstream sections of the system can be connected or are connected in a ring or series connection.

10. The device according to claim 9, wherein the control unit is designed for controlling the manipulator as well as the transport apparatus, wherein the control unit is connected to at least one sensor arranged on one of the upstream and/or downstream sections of the system, wherein the sensor detects the operating state of the respective section, so that the activity of the manipulator as well as of the transport apparatus can be controlled via the control unit depending on the respective operating state of the upstream and/or downstream section.

11. A system for producing food products, with a device according to claim 1.

12. A method for use with a device according to claim 1, for temporarily storing stacks of piece goods, wherein the piece goods are product carriers, in a system for producing food products, wherein the stacks of piece goods are provided in a clocked manner at a transfer point of the system integrated in the device or adjacent to the device, and wherein a manipulator transfers in each case at least one piece of goods of a stack of piece goods, either from the transfer point or from one of a plurality of storage points of a buffer section to the delivery point, provided that the piece goods can be picked up from a downstream section of the system.

13. The method according to claim 12, wherein the stacks of piece goods pass first in the direction of transport through one or more treatment stations up to the transfer point.

14. The method according to claim 12, wherein the manipulator transfers in each case a plurality of piece goods of a stack of piece goods at once.

15. The method according to claim 12, wherein in the event of an interruption of operation in a section of the system arranged downstream of the device, the stacks of piece goods arriving at the transfer point are moved by the transport apparatus to the storage point located nearest from the transfer point in the direction of transport, and the stacks of piece goods already temporarily stored are moved from their respective storage point to the storage point located nearest in the direction of transport, wherein when operation is resumed by the section of the system downstream of the device, the stacks of piece goods temporarily stored at the storage points are transferred by the manipulator to the delivery point.

16. The method according to claim 15, wherein the stacks of piece goods temporarily stored at the storage points are transferred by the manipulator to the delivery point according to the first-in first-out principle.

17. The method according to claim 12, wherein the flow rate of piece goods delivered to the downstream section of the system is between 0 and 120% in relation to the number of piece goods arriving at the transfer point per machine cycle of the transport apparatus.

18. The method according to claim 12, wherein a control unit and at least one sensor connected to the control unit and arranged on one of the downstream sections of the system are provided, wherein the control unit comprises interfaces for data transfer with control units of upstream and/or downstream sections of the system and is connected to the control units of the upstream and/or downstream sections of the system in a ring or series connection, wherein the sensor determines the operating state of the downstream section of the system, and wherein the activity of the manipulator as well as of the transport apparatus is controlled and/or regulated via the control unit depending on the operating state of the downstream section.

19. The method according to claim 18, wherein there is further provided an apparatus for the automated detection of the occupancy state of the storage points, wherein when all storage points present in the apparatus are completely occupied, the production in at least one of the upstream sections of the system is stopped, and wherein at least the storage point directly preceding the delivery point is emptied by the manipulator before production is resumed.

* * * * *